Nov. 1, 1949. H. A. W. KLINKHAMER 2,486,656
PERMANENT MAGNET GENERATOR SYSTEM
Filed April 25, 1946

INVENTOR
HENDRIK ABRAHAM WIJNAND KLINKHAMER
BY E. F. Wentworth
ATTORNEY

Patented Nov. 1, 1949

2,486,656

UNITED STATES PATENT OFFICE 2,486,656

PERMANENT MAGNET GENERATOR SYSTEM

Hendrik Abraham Wijnand Klinkhamer, Eindhoven, Netherlands, assignor, by mesne assignments, to Hartford National Bank and Trust Company, Hartford, Conn., as trustee Application April 25, 1946, Serial No. 664,720
In the Netherlands July 2, 1941

Section 1, Public Law 690, August 8, 1946
Patent expires July 2, 1961

1 Claim. (Cl. 322—46)

Dynamos comprising permanent field magnets, particularly dynamos having a flat voltage-current characteristic curve, suffer from the limitation of being only suitable for a more or less restricted current-intensity. In the case of higher loads the permanent magnet is indeed, by reason of the magnetic field provided by the winding of the dynamo subjected to such demagnetisation that in these circumstances the magnet loses its magnetism to a considerable extent so that the output of the dynamo is greatly decreased and the dynamo as such may even be no longer serviceable.

According to the invention, this disadvantage of dynamos comprising permanent field magnets is obviated by the use of a dynamo in series with which a so proportioned capacity is inserted that in the case of a high load the current is so out of phase with the voltage set up that the field provided in the windings by the current is prevented from exercising a harmful demagnetising reaction on the permanent magnets. "High loads" are to be understood to mean here currents which but for the condenser used in accordance with the invention would bring about harmful demagnetisation of the permanent magnets.

As mentioned before, the present invention is particularly important in connection with dynamos having a flat voltage-current characteristic curve, that is to say that the voltage in the working range, in the case of decreasing or increasing current strength respectively, varies so as to be little dependent on the desiderata, for example up to about 10%. By dynamos of this kind large current strengths may generally be delivered. But for the use of the measure according to the invention it would, however, only be possible to admit small loads of which one is certain that they do not bring about any inadmissible demagnetisation of the magnet. This, however, causes the use of such dynamos to be practically unimportant in this case.

In the use of permanent field magnets made of a magnet steel having a demagnetising curve of steep slope the measure according to the invention is indispensable. A demagnetising curve of "steep" slope is to be understood to mean here a curve with which the tangent of the angle formed by the tangent to the curve at the point of the coercive force with the horizontal axis of the graph exceeds about 40. With magnet steels having such a demagnetising curve even a comparatively low demagnetising force results in comparatively large demagnetisation. Such is the case in a very great extent for example with anisotropic magnet steels having a (BH)max value of at least 2,500,000 for example from 4 to 5,000,000 so that steels of this kind could not hitherto be used for the object in view. Now, the present invention renders even this use possible.

In order to reduce to a minimum the demagnetisation which still occurs in spite of the use of the invention and which, as a matter of fact, can be looked upon as harmless, it is generally preferable that the working point on the demagnetisation curve should be chosen at such a point that the main direction of the working range described about this point when in use coincides at least approximately with the tangent to the demagnetising curve at this point. As a rule, this working point will not coincide with the point of the demagnetising curve for which the product of B and H is a maximum.

It is possible to proportion the capacity inserted in series with the dynamo so that the load current in the windings thus displaced in phase has a largely magnetising effect on the permanent magnets.

In certain cases in which very high load currents, for example transient or even prolonged short-circuit currents occur, proportioning of the condenser permits not only of avoiding the occurrence of demagnetisation rendering the dynamo practically unserviceable, but even of obtaining an almost entirely magnetising effect.

Even with a dynamo thus safeguarded against short-circuit, demagnetisation of the magnets may occur if sparking arises for any reason. In order also to safeguard the magnets from this, an inductance may in addition be connected, in series with the dynamo, to one of the terminals of the latter and, in parallel with this series combination, a supplementary condenser may be connected, said component members being so proportioned that the detrimental effect of the sparks is suppressed as far as possible. Presumably, the inductance-condenser combination works as a filter for the supplementary frequencies which occur in the case of sparking and which apparently exercise a harmful influence.

In order that the invention may be readily understood and carried into effect it will now be described more fully with reference to the accompanying drawing, in which one embodiment is illustrated.

Figure 1:
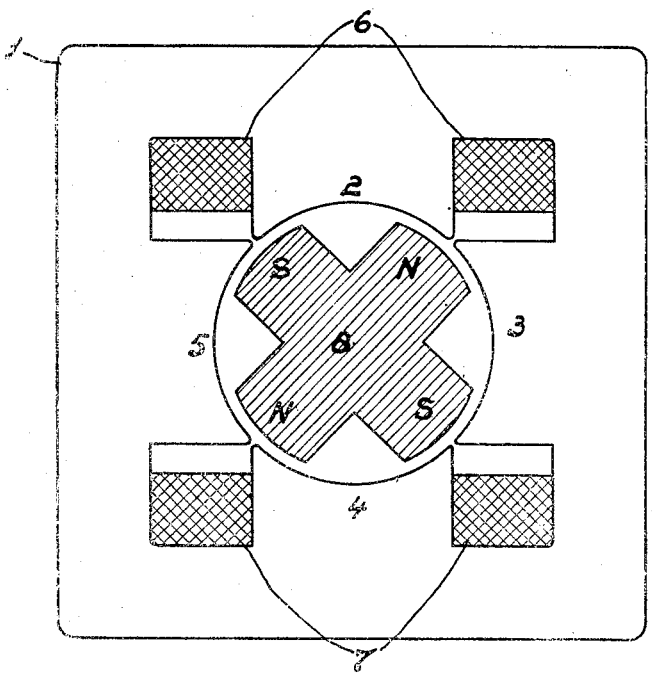
Fig. 1 is a diagrammatic view of a permanent magnet generator according to the invention.

Fig. 1 shows a dynamo 1 having armature poles 2, 3, 4 and 5, armature windings 6 and 7 and a permanent-magnetic four-polar rotor 8 for providing the required field.

In the rotor's position shown by Fig 1 the stator has passing through it, supplied by the magnets N and S, a flux which, in the windings 6 and 7, generates the E. M. F. which in the case of high loads delivers a current having a harmful demagnetising effect on the poles N and S. By inserting in accordance with the invention a suitably proportioned condenser 9 in series with the dynamo, the current may be caused to be out of phase with the E. M. F. set up to such extent that the said harmful effect is reduced to an admissible value, in some cases of short-circuit, or even a magnetising effect on the poles of the rotor is obtained.

Figure 2:
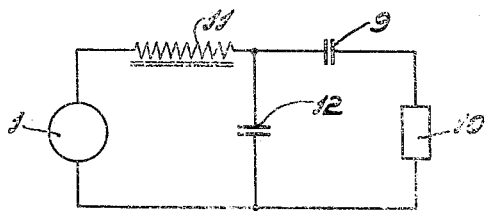
Fig. 2 shows a form of circuit embodiment according to the invention.

Referring to Fig. 2, the dynamo is again designated 1, the condenser is designated 9 and the load 10.

In order also to safeguard the dynamo, as mentioned before, against the harmful effect of sparking, an inductance 11 is connected, in series with the dynamo, to one of its terminals and a supplementary condenser 12 is connected in parallel with the series combination of the dynamo 1 and the inductance 11.

With an existing model of 0.4 kilowatt, 220 volts, the value of the condenser 9 was about 29 $\mu$f. and the weight of the dynamo was about 12 kilograms, the poles 2, 3, 4 and 5 being constructed, as also shown in Fig. 1, in such manner, that the poles of the magnets are bridged in a certain manner. Owing to this parallel-path for the magnetic lines of force demagnetisation of the poles of the magnets due to air gaps (exceedingly long air-paths) in the conducting iron circuit is avoided.

In the said case the weight in magnet steel was only about 1.9 kg., use being made of steel having a $(BH)_{max}$ of nearly 4,000,000. It has thus become possible to construct dynamos whose size and weight are considerably lower than those of the dynamos hitherto existing of like power or conversely to draw a considerably higher power from the same size and weight, whilst in addition the possibility of protection against short-circuit and sparking presents a particular advantage.

The possibility of constructing the dynamos of small size by means of the invention is not only due to the use of steels of high $(BH)_{max}$ value but also to the fact that only by the use of the invention it has become possible to utilise the exceptional magnetic properties of these steels of high $(BH)_{max}$ value as economically as possible.

What I claim is:

Dynamo-electric apparatus, comprising a permanent magnet dynamo-electric generator normally having a substantially flat voltage-current characteristic curve, a load element coupled to said permanent magnet generator, a first capacitive element and an inductive element connected in series with the said generator and said load element, and a second capacitive element connected in series with the said generator and said inductive element, said elements having a combined reactance value producing a leading current through said generator and at which under approximately full load operating conditions of the generator the output current of said generator is displaced in phase relation to the voltage thereof, the said elements being so proportioned that the generator is secure against the demagnetising effect of the load current during intervals of sparking.

HENDRIK ABRAHAM
WIJNAND KLINKHAMER.

REFERENCES CITED

The following references are of record in the file of this patent:

UNITED STATES PATENTS

| Number | Name | Date |
|---|---|---|
| 1,513,633 | Scheller | Oct. 28, 1924 |
| 2,071,573 | Randolph | Feb. 23, 1937 |
| 2,218,859 | Schweitzer | Oct. 22, 1940 |